(12) United States Patent
Bernardini et al.

(10) Patent No.: US 8,086,596 B2
(45) Date of Patent: Dec. 27, 2011

(54) HEALTHCHECK OF INFORMATION TECHNOLOGY INFRASTRUCTURE BASED ON LOG DATA

(75) Inventors: Fausto Bernardini, New York, NY (US); Rong N. Chang, Pleasantville, NY (US); Chang-Shing Perng, Goldens Bridge, NY (US); Edward C. So, Flushing, NY (US); Chunqiang Tang, Ossining, NY (US); Tao Tao, Briarcliff Manor, NY (US); Chun Zhang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 12/121,301

(22) Filed: May 15, 2008

(65) Prior Publication Data

US 2009/0287744 A1    Nov. 19, 2009

(51) Int. Cl.
*G06F 17/30* (2006.01)
(52) U.S. Cl. ...................................................... 707/713
(58) Field of Classification Search .................. 707/809, 707/713
See application file for complete search history.

(56) References Cited

U.S. PATENT DOCUMENTS

| 7,251,584 | B1* | 7/2007 | Perazolo et al. | 702/183 |
| 2004/0054695 | A1* | 3/2004 | Hind et al. | 707/200 |
| 2004/0264672 | A1* | 12/2004 | Paek et al. | 379/221.03 |
| 2007/0130231 | A1* | 6/2007 | Brown et al. | 707/204 |
| 2009/0112860 | A1* | 4/2009 | Yuasa et al. | 707/6 |

OTHER PUBLICATIONS

Wikipedia, Load Balancer (computing), Mar. 9, 2006.*
Zhang, Chun et al., Leveraging Service Composition Relationship to Improve CPU Demand Estimation in SOA Environments, IBM T.J. Watson Research Center.

* cited by examiner

*Primary Examiner* — James Trujillo
*Assistant Examiner* — William Spieler
(74) *Attorney, Agent, or Firm* — Scully, Scott, Murphy & Presser, P.C.; Daniel P. Morris, Esq.

(57) ABSTRACT

Checking health of information technology infrastructure based on log data, in one aspect, may collect log data non-intrusively from a production system, said log data at least associated with transactions occurring in the production system and resource utilization of the production system, may normalize said log data into a plurality of log data types, may perform data regression analysis using said plurality of log data types to estimate resources consumed by each of said transactions and throughput of each of said transactions, and may use a queuing model to predict performance of the information technology infrastructure under various workloads.

20 Claims, 5 Drawing Sheets

HEALTHCHECK OF INFORMATION TECHNOLOGY INFRASTRUCTURE BASED ON LOG DATA

FIELD OF THE INVENTION

The present disclosure relates to computer systems and information technology (IT), and particularly to evaluating the health of IT infrastructure based on log data.

BACKGROUND OF THE INVENTION

Information Technology (IT) has become an integral part of modern organizations. Often, the IT infrastructure that supports critical business activities is continuously monitored to ensure the health of the IT infrastructure. Many organizations have a large volume of log data generated by various monitoring tools. An IT service provider can offer high-value services that shed light on the health of a customer's IT infrastructure by analyzing their log data. Typically, however, the logs only contain limited high-level monitoring information. Most existing performance analysis tools use intrusive approaches to instrument a running system and gather detailed performance data needed for their specific analysis. It is a challenge to perform and provide accurate analysis in a non-intrusive way.

In an IT infrastructure based on Service Oriented Architecture (SOA), functional capabilities of a computing component are externalized via one or more service interfaces such as WSDL-specified Web Services. Driven by the demand for business agility and return-on-investment optimization, various dynamic service discovery and composition technologies have been proposed with a common goal of enabling business aligned fulfillment of customer service requests. Workflow technologies, for example, can dynamically build a composite service from atomic services through the use of control flows such as sequential, branch, parallel and loop. SOA helps to dynamically construct composite services out of a set of low-level atomic services to satisfy customer requests. Providing quality-of-service (QoS) guarantees in such a dynamic environment is an asset for achieving the success of SOA. This requires the knowledge of how composite services and atomic services consume IT resources. Understanding these services' demand for system resources, e.g., CPU, would be of great help in capacity planning and resource provisioning.

BRIEF SUMMARY

A system and method for checking health of information technology infrastructure based on log data may be provided. The method, in one aspect, may comprise collecting log data non-intrusively from a production system. The log data is associated with at least transactions occurring in the production system and resource utilization of the production system. The method may also comprise normalizing said log data into a plurality of log data types performing data regression analysis using said plurality of log data types to estimate resources consumed by each of said transactions and throughput of each of said transactions. The data regression analysis may include solving a least square problem of linear regression between the observed request throughput and resource utilization level. The method may further include using a queueing model based on the estimated resources consumed and the estimated throughput to predict performance of IT infrastructure under a plurality of workloads.

A system for checking health of information technology infrastructure based on log data, in one aspect, may comprise a computer-implemented analyzer module operable to use log data collected non-intrusively from a production system, said log data at least associated with transactions occurring in the production system and resource utilization of the production system. A computer-implemented data transformer module is operable to normalize said log data into a plurality of log data types. The analyzer module further is operable to perform data regression analysis using said plurality of log data types to estimate resources consumed by each of said transactions and throughput of each of said transactions.

A program storage device readable by a machine or a processor, tangibly embodying a program of instructions executable by the machine or the processor to perform a method of checking health of information technology infrastructure based on log data, may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
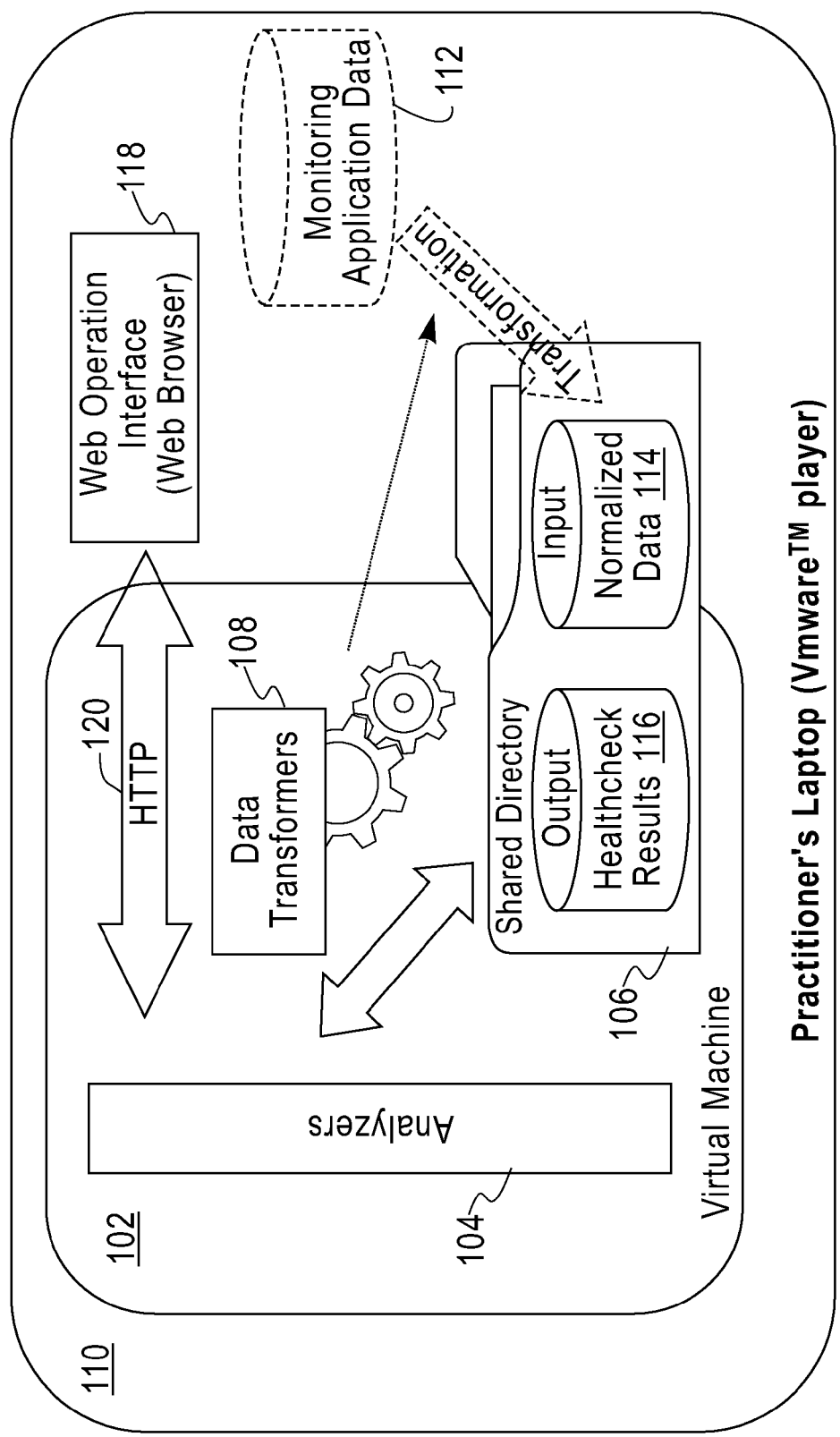
FIG. 1 is a diagram illustrating functional components of the present disclosure in one embodiment.

A system and method in one embodiment analyze the health of individual servers and server clusters based on widely available basic log data such as system resource utilization and transaction throughput. Deep insights on system health may be uncovered using the system and method of the present disclosure. Health of a system generally refers to the system's state or condition, for example, in terms of resource capacity, throughput, or like attributes that describe the overall performance of the system and how the system is functioning.

In one aspect of the system and method of the present disclosure, data regression analysis is used to align the observed resource utilization with the observed transaction throughput so as to estimate resources consumed by different types of transactions as well as resources consumed by background activities. While doing so, issues caused by the volatility of system resource consumption may be addressed. Once the estimated resource consumption is established, queueing models are built to predict the performance under previously unseen workloads. Moreover, the analysis can identify under-provisioned or over-provisioned system resources, heavy weight transactions that need improvement because they consume too much system resources, and/or symptoms of improper system configurations that cause busy background activities on the servers.

The system and method further may combine the information obtained from individual server analysis with the topology information of a cluster to identify the performance bottleneck of the server cluster, which can be the front-end load balancer and/or a back-end server. The system and method may also include comparing the performance of different back-end servers to identify those with anomaly behavior, which may provide an indication of health problem.

The system and method may be used to understand the cause of performance problems with various IT infrastructures, operational service oriented architecture (SOA) environment, etc., in a non-intrusive manner. The system and method of the present disclosure may be embodied as a computer-implemented tool or apparatus, which can guide a client or customer through the data analysis findings of the client or customer's system data to explore options for improving infrastructure performance and resource utilization. Based upon the analysis, a set of remedial actions may be identified to address the current performance problems. The client may also gain greater insight into how services interact with the system and where improvements to IT infrastructure design can be realized.

In one aspect, the system and method of the present disclosure is non-intrusive, need not be installed in the production system or target system that is being monitored. There is no need to install any software code or hardware tools in the customers' production system. After the selected infrastructure data files are made available, for example, from the customer system administrator, the data may be processed offline without disturbing or interfering with the live production systems.

The system and/or method of the present disclosure may be utilized as a service tool. For instance, the tool stays in the analyzer's machine as a service tool and, for instance, used by vendors as a diagnostic tool. In one aspect, it need not be installed in customers' machines. Customers do not need to operate the tool, and hence, no training for customers is needed.

The system and method of the present disclosure may be technology, vendor, and product agnostic. That is, the system and method may work with as many existing infrastructure monitoring products as possible. In one embodiment, to make the tool generic, a set of product-neutral data formats are defined, which contain information that can be extracted from common system operation data sources. These data formats are published; data transformers that transform product-specific data to the generic data formats can be developed. Data transformers may be also included as part of the service tool.

The system and/or method of the present disclosure may perform partial diagnosis. That is, the system and/or method may utilize as much data as possible but does not require all possible data types to be available before any analysis can be done. As more types of the data become available, more analysis may be performed. The system and/or method intelligently, automatically, and/or dynamically decide what analysis can be done with the data provided.

FIG. 1 is a diagram illustrating functional components of the present disclosure in one embodiment. The system and method of the present disclosure may be implemented as a virtual machine 102 (e.g., a Java™ Virtual Machine) that, for example, includes an operating system, for example, a Linux operating system, a Web server, a database server, and computer instructions or analyzer code 104 that perform system health analysis. The system and method may utilize virtual machine software such as a Vmware™ Player, and may run on a computer system, personal computer (PC), laptop, or other like devices 110.

The virtual machine 102 may utilize a shared directory 106 to enable the exchange of input and output data between the virtual machine 102 and the system 110 that the virtual machine 102 is running on. This approach eliminates any need to log in to the virtual machine. For instance, the user can submit input log data to the virtual machine (VM) through the shared directory, and also get analysis report generated by the tool from the shared directory. The shared directory serves as one interface between the VM and the host (e.g., personal computer (PC) or laptop), and the user does not have to log into the VM (using either ssh or ftp or other tools) in order to submit input log data or obtain analysis reports.

Monitoring Application Data 112, that is, the data gathered from the production or target system whose health is being analyzed, may be retrieved into the user's system 110. In one embodiment, the data 112 to be analyzed is normalized 114 before any processing is started. A set of data transformers 108 normalizes the data 112 from the production system into a format that can be used by the analyzer 104. Depending upon client monitoring applications, additional data transformers may be developed. Customized data transformers may be developed for different client system, i.e., production or target system. The resulting normalized data 114 is copied to the shared directory 106.

The monitoring application data 112 may include data logged from the production system such as throughput log data and resource utilization log data. In one embodiment, the analyzer 104 takes the throughput log data and resource utilization log data (e.g., normalized by the transformers) as input and uses data regression to estimate the resources consumed by processing one transaction request, and uses a queuing model to predict response time when throughput varies. In another embodiment, the analyzer 104 takes cluster configuration data, throughput log data and resource utilization log data (e.g., normalized by the transformers) as input, and uses similar approaches to estimate performance analysis on a cluster infrastructure. Furthermore, the analyzer 104 may examine the load balance execution of the load balancer and identify potential bottlenecks within a cluster.

Suppose a machine has one CPU and processes n different types of transactions (e.g., credit card authorization and user account update). The resource utilization level (e.g., CPU utilization) of the machine and the response times of different types of transactions are two performance metrics to consider. For transaction type i, denote $s_i$ the service time, and $\lambda_i$ the transaction arrival rate. The machine utilization $\rho$ is, $$\rho = \sum_j \lambda_j E(s_j).$$

The machine may process transactions using scheduling policies such as the round-robin scheduling policy or the first-come-first-served (FCFS) scheduling policy. If the machine uses the round-robin scheduling policy, for example, according to the queueing model theory, the average response time of type i transactions, $E(r_i)$, can be estimated as:

$$E(r_i) = E(s_i)/(1-\rho).$$

If the machine uses the FCFS scheduling policy, assuming that for each transaction type i, the arrival process is Poisson, and the service time is exponential, according to the queueing theory, the average response time of type i transactions, $E(r_i)$, can be estimated as:

$$E(r_i) = \frac{\sum_j \lambda_j [E(s_j)^2]}{1 - \sum_j \lambda_j E(s_j)} + E(s_i),$$

In this equation, the average transaction service times, $E(s_j)$, $j \in \{1, \ldots, n\}$, are the parameters needed for predicting machine utilization ρ and average response times $E(r_i)$ under various transaction arrival rates $\lambda_j$, $j \in \{1, \ldots, n\}$. In one embodiment, the linear regression approach is used to estimate the average transaction service times $E(s_j)$, $j \in \{1, \ldots, n\}$, using as input the observed machine utilization and the observed transaction arrival rates. Once the average transaction service times are obtained, predictions are made for the machine utilization ρ the average transaction response times $E(r_i)$, and the average transaction waiting times ($E(r_i)-E(s_i)$) by using the above equations.

Based on the predicted results, a lookup table can be used to identify potential performance problems and look for potential solutions. Below is one example of such lookup tables that can be used for server healthcheck.

| Symptoms Per Server | Potential Problems Per Server | Suggestions Per Server |
|---|---|---|
| High Utilization (more than high utilization threshold) | Machine OverUtilized | Add more machines, and/or upgrade machine |
| Long Response Time Per Request Type (more than corresponding response time threshold) | Machine too slow, and/or too busy | Add more machines, and/or upgrade machine, and/or streamline implementations |
| Long Waiting Time Per Request Type (more than corresponding waiting time threshold) | Machine too slow, and/or too busy | Add more machines, and/or upgrade machine, and/or streamline implementations |
| Long Service Time Per Request Type (more than corresponding service time threshold) | Machine too slow | Upgrade machine, and/or streamline implementations |
| Low Throughput (lower than customer expected throughput) and Low Utilization (lower than low utilization threshold) | Too Tight Access Control | Check access control policy to allow more request instances |

Data transformers 108 that transform the data 112 collected from different production or target system into a normalized format 114 allows the analyzer 104 to be product-neutral. Several Comma-Separated Values (CSV) format-based data types may be defined to normalize the source system data 112. The input file to the analyzers 104 may contain a set of data formatted or normalized in one of the data types. The pre-defined data types may include, but are not limited to, resource utilization, request log, cluster configuration, and invocation log.

Different set or sets of data types may be utilized in performing various types of analysis. For example, to perform the server healthcheck, resource utilization and request log data types may be used. To perform the cluster healthcheck, resource utilization, request log and cluster configuration data types may be utilized.

In one embodiment, the system and method of the present disclosure may be implemented as a Web-based application, having a Web user interface. A Web browser 118 such as Internet Explorer™ or Firefox™ from the native system 110 may be utilized to allow for user interaction via Hypertext Transfer Protocol (HTTP) 120.

After launching the Web interface 118, the user may be presented with the infrastructure data files that were retrieved from the shared directory 106, and the options for analysis. After the processing or analysis of the data is completed, the Web interface 118 displays the results 116 in Hypertext Markup Language (HTML) format. This outcome provides the source of information for the user to help populate the client deliverable or report of the infrastructure Healthcheck.

Figure 2:
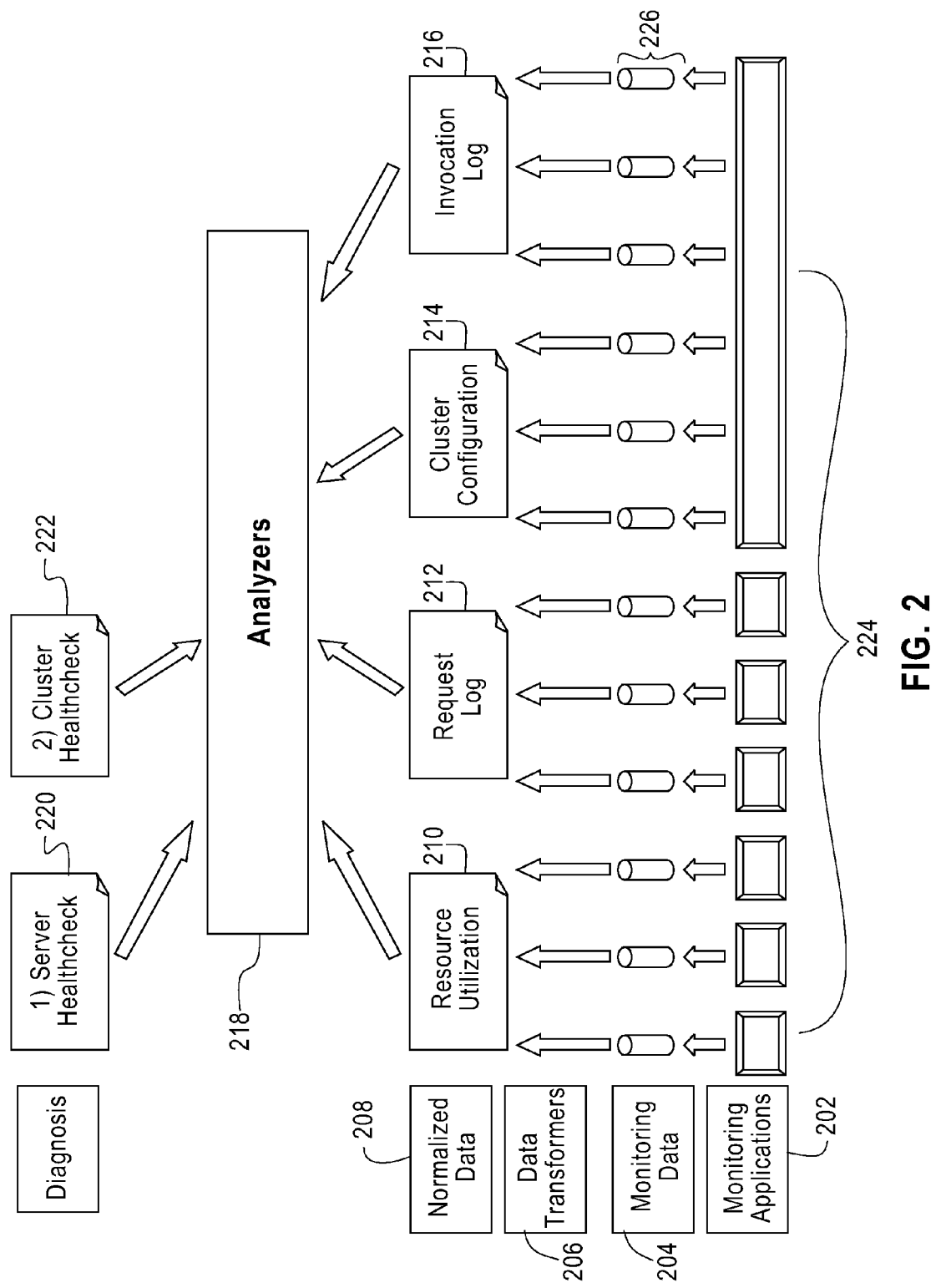
FIG. 2 illustrates an overview of data-driven approach utilized in one embodiment of the present disclosure.

FIG. 2 illustrates an overview of data-driven approach utilized in one embodiment of the present disclosure. One or more production systems, also referred to as target systems 224, whose health is being checked may produce the monitoring data 204, for example, various types of log data, using one or more monitoring applications 202. Those applications 202 generate data 226 that is typically hosted in log files or a data warehouse. The system and/or method of the present disclosure receive and use the data 204 to perform the healthcheck analysis. One or more data transformers 206 take the monitoring data 204 and produces normalized data 208. The normalize data 208 may include resource utilization data 210, request log data 212, cluster configuration data 214, and invocation log 216. The analyzer 218, for instance, using data regression takes the various types of data 210, 212, 214, 216 and performs diagnosis for server healthcheck 220, cluster of server healthcheck 222, etc., generating, for example, resource utilization statistics per request type instance or transaction.

Table 1 illustrates the normalized data types and their corresponding potential data sources. Table 1 shows examples of data transformations that can be conducted and are not an exhaustive list. For example, Apache Tomcat may generate an HTTP Access Log, which can be transformed to produce normalized request log data. ITCAM (IBM Tivoli Composite Application Management) for SOA may generate a Metric log, which can be transformed to produce both normalized request log data and normalized invocation log data. ITM (IBM Tivoli Monitoring) may generate Windows™ and Linux® CPU usage data, which can be transformed to produce normalized resource utilization data. ITCAM for Response Time Tracking (RTT) may generate response time invocation data, which can be transformed to produce both a normalized request log and a normalized invocation log. WebSphere® Process Server, or WPS, may generate Common Base Event (CBE) events, which can be transformed to produce both a normalized request log and a normalized invocation log. Websphere Application Server (WAS) and WAS Community Edition (CE) may provide HTTP Access Log, indicating which URL is accessed at what time.

TABLE 1

| Monitoring Application | Monitoring Data | Data Source | Resource Utilization | Request Log | Cluster Configuration | Invocation Log |
|---|---|---|---|---|---|---|
| ApacheTomcat | HTTPAccess Log | | | X | | |

TABLE 1-continued

| Monitoring Application | Monitoring Data | Data Source | Resource Utilization | Request Log | Cluster Configuration | Invocation Log |
|---|---|---|---|---|---|---|
| ITCAMfor SOA | Metric Log | | | X | | X |
| ITM | NT CPU | TEDW | X | | | |
| | Linux CPU | TEDW | X | | X | |
| TADDM | | | | | | |
| WAS | HTTP Access Log | | | X | | |
| WAS CE | HTTP Access Log | | | X | | |
| ITCAM RTT | | | | X | | X |
| WebSphereProcess Server | WebSphereCBE Events | | | X | | X |

A server healthcheck identifies potential performance problems with selected individual servers. Two types of inputs may be considered or used when performing the server health check. One type may be a machine resource utilization log that records the machine resource utilization level over time. An example is CPU utilization. The second input type may be a request log that records the finishing time and, optionally, the starting time of individual transactions processed by machines. Individual transactions may be any type of system transactions such as web browsing and other processing application requests such as order processing, accounting transactions or any other transactions. Using both inputs, the system and method perform deep analysis and provide various insights regarding the health of the selected servers.

For instance, the system and method of the present disclosure may identify under provisioned or over provisioned machine resources. Customers or clients can use this information to adjust resource allocation, for instance, for improving the performance of the system. As another example, the system and method of the present disclosure may compute the average resource consumption of each transaction type. Transactions with abnormally high resource consumption may be identified as indications to potential performance problems, and they may be the subject of in-depth analysis and future improvement. Yet as another example, the system and method of the present disclosure may compute the proportion of machine resources consumed by background programs that are not directly involved in transaction processing. Background utilization is defined as the proportion of resources consumed by background programs that are not directly involved in transaction processing. High background utilization of a server resource might indicate a server configuration problem or the need to move the intensive background programs to a separate machine for performance reasons. Background programs that consume a significant proportion of machine resources may be identified as a cause to a server configuration problem. Background processes that perform useless work and spin on the CPU, or the background programs that although carry out useful work, but should be moved to a separate machine for performance reasons, may be identified. Still yet as another example, in addition to analyzing server performance under the current workload, the system and method of the present disclosure may predict the performance of the servers under previously unseen workloads, such as when transaction rates scale up in the future. This capability helps customers to assess whether their infrastructure is well prepared to accommodate increased workloads in the future.

Server healthcheck results may be presented, for example, via a user interface. A screen showing a resource utilization table may be presented, for example, with the columns of the table listing all the types of server resources discovered in the log files. For instance, columns of the table may list the average, minimum, and maximum utilization of the resources for a given resource. Different rows of the table may show data related to different resources. Sorting and other functionality may be provided to manipulate the manner in which the table is presented. For instance, clicking the title of a column may sort that column in a selected format. Additional column in the table may show the background utilization of different resources.

Server health check result that shows the service time and throughput table may also be presented via a user interface such as a graphical user interface screen. The table may show for each resource, data parameters that describe the transaction type, service time, and/or average throughput per second, etc. The service time is defined as the average time spent on processing one request of a given transaction type. In one embodiment, this excludes all types of waiting times including waiting for disk or network, or waiting in the central processing unit (CPU) scheduling queue before the transaction can run on the CPU. Options for manipulating the manner in which the data is presented may be provided. For example, clicking the "service time" title of the column may sort the table based on the service time, which identifies "heavy-weighted" transactions for future performance improvement. An unreasonably long service time, compared with the expectation of the application developer or the customer, indicates a problem in the application implementation or in the infrastructure. Another column of the table may show the throughput of different transactions. Sorting the table based on throughput identifies the high-frequency transactions on which the healthcheck should focus. For instance, frequent transactions with long service times may deserve more attention because they consume a large proportion of the server resources.

In addition to analyzing server performance under the current workload, the system and method in one embodiment may predict the performance of the servers under previously unseen workloads. For each transaction type running on a given server, a report may be provided that shows how a transaction response time changes as the transaction throughput increases or as the server utilization increases. For instance, an X-Y graph chart may show the predicted response time as a function of server resource utilization. Another X-Y graph chart may show the predicted response time as a function of the transaction throughput. For instance, an X-Y graph chart may be provided that shows the predicted performance of a task, for example, task_0 running on a host, for example, host_3. The X-axis may show the throughput (e.g., throughput per second) of task_0, and the Y-axis may show the response time. As another example, an x-y graph chart may have the X-axis as the utilization level of host_3's CPU, and the Y-axis as the response time. The charts may show that as the throughput increases, both the server utilization and the response time increase. The charts may help assess whether the infrastructure is well prepared to accommodate increased workloads in the future.

Figure 3:
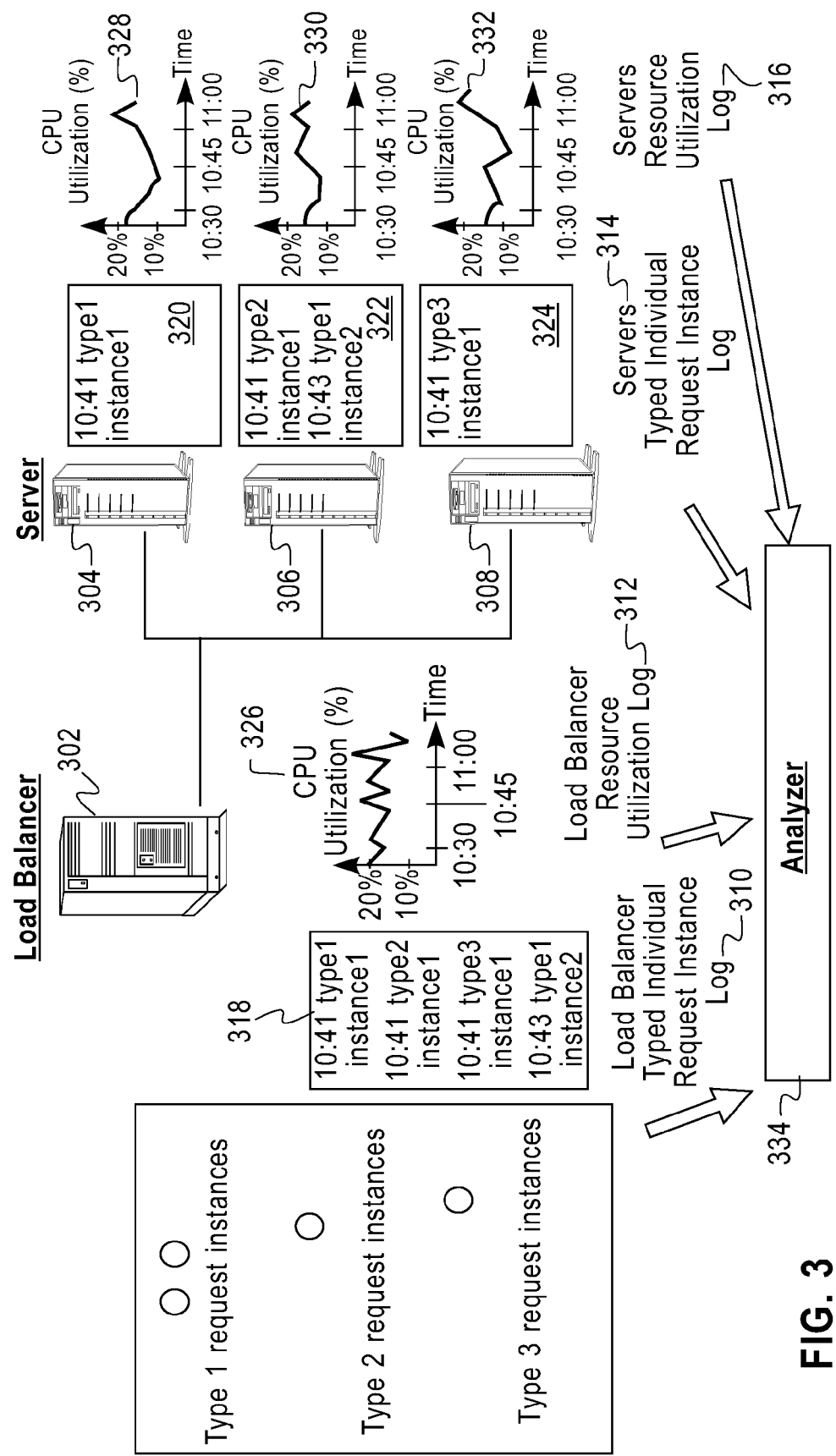
FIG. 3 illustrates an example of a cluster healthcheck configuration in one embodiment of the present disclosure.

In another embodiment of the present disclosure, the system and method can also identify potential performance problems with clusters. FIG. 3 illustrates an example of a cluster healthcheck configuration in one embodiment of the present disclosure. Typically, a cluster comprises a front-end load balancer 302 and a set of back-end servers (e.g., 304, 306, 308). Clustering is often used to improve the scalability and availability of a system. Cluster healthcheck, or performing healthcheck for the cluster uses the same inputs as in the server healthcheck scenario described above. The inputs used in performing cluster healthcheck may include the request log 310, 314 and the resource utilization log 312, 316. The request log and the resource utilization log may be collected on both the load balancer 302 and the back-end servers 304, 306, 308. Request logs may include the log of various types of transactions or requests 318, 320, 322, 324 handled by the load balancer 302 and the servers 304, 306, 308, respectively. Resource utilization logs may include CPU utilization data 326, 328, 330, 332 associated with the load balancer 302 and the servers 304, 306, 308, respectively.

Cluster healthcheck, for instance, performed by the analyzer functional component 334 of the present disclosure, determines whether the load balancer is the source of the bottleneck in the performance of the overall system. Ideally, the throughput of a cluster improves as the number of back-end servers increases. However, if the front-end load balancer is the performance bottleneck, adding more back-end servers provides no performance benefits. By analyzing the input log files, the system and method of the present disclosure determine whether the load balancer is actually the performance bottleneck of the whole system. If so, a more powerful load balancer is needed to improve performance.

Cluster healthcheck also determines whether the load is evenly distributed among the back-end servers. Ideally, the load balancer should evenly distribute load among back-end servers so that they have roughly the same level of resource utilization. However, it is possible to have an uneven load distribution. For example, an uneven load distribution might be caused by a problematic load distribution policy or by the fact that not every application runs on every back-end server. When this happens, some back-end servers might remain idle while other servers are overloaded. This leads to extremely long response times for some requests. The system and method of the present disclosure can help determine whether the load is properly balanced across the back-end servers, and identify the back-end server that has the highest resource utilization level. Cluster healthcheck may also comprise performing the basic server healthcheck on the load balancer and each back-end server. The resources consumed by background programs and the service time of each transaction type may be computed.

Generally, the following steps may be performed for system health check. Raw monitoring data is obtained. VM is booted up or started. The raw monitoring data is converted into normalized data. Using the Web GUI, for example, the processing task is selected, for example, server health check and/or cluster health check, and related control parameters or like are specified if desired. Analysis starts using the input and raw monitoring data and an analysis report is produced. The user may copy the analysis reports from the shared directory for later reuse. The user may study the analysis reports with the help of a technical report that explains how to interpret the analysis reports. The user may further summarize the reports and present identified problems and resolution recommendations to the customer.

A report may be generated that, for example, show the summary of the cluster health check. The report may be presented on a user interface screen, printed, and/or stored on a computer readable medium, etc. The report, for example, may show the utilization of the load balancer, which helps determine whether the load balancer is the bottleneck. The report may also include the average utilization of the back-end servers and its standard deviation. A large standard deviation, with respect to the mean, indicates that the load is not well balanced across the back-end servers. The report may further include the back-end server with the highest utilization, which might be the bottleneck of the cluster. The detailed server reports may be used to understand the reason why this server is highly utilized. The report may also show the utilization of each back-end server, and the degree of load balance across the servers.

As discussed above, the system and method of the present disclosure uses input data and determines health or performance analytics of a server or a cluster of servers. The input data is generally obtained in a non-intrusive manner, for instance, without intrusive software instrumentation. That is, the input data, for example, associated with request throughput and resource utilization level over time, are monitored data that are readily available. An analyzer component, for instance, shown in FIG. 1, may perform the analysis. In one aspect, the analysis may include a method to estimate a resource (e.g., CPU) demand of service requests based on linear regression between the observed request throughput and resource utilization level. The linear regression may be employed to infer an estimate of resources consumed by each request, and/or determine or estimate which processes or transactions utilize which resources at which time.

Composition relationships or service composition relationships describe how low-level atomic services are connected into a high-level composite service. An example of composite service is the credit card payment service, which includes two-lower level atomic-services executed sequentially, first the charging-credit-card atomic service, followed by the email-notification atomic service. The composition relationships can either be automatically extracted from Invocation Log 216, or explicitly provided by an external user. The proposed method in one embodiment can use composition relationships to further improve the quality of resource (e.g., CPU) demand estimation. Specifically, two or more atomic services may have request processing throughput that are proportional to one another, because the composition relationships dictate so. For example, the charging-credit-card atomic service and the email-notification atomic service are always executed together (as is indicated in the composition relationship), and hence their throughputs are always proportional. If two or more atomic services have proportional throughput, we call them collinear atomic services. For collinear atomic services, the linear regression method may not uniquely decompose the aggregated resource utilization to each individual atomic service. By leveraging the composition relationships to analyze the linear dependency between a composite service and its constituent low-level atomic services using linear algebra, the method can eliminate the collinear problem introduced by the composition relationships. Moreover, the method can reduce the number of unknown variables in the linear regression problem, and hence reduce the time duration needed to collect input data. Here one "unknown variable" is the resource demand for one atomic service to be estimated.

The following illustrates formulating the resource demand estimation problem, in one embodiment of the present disclosure. The formulation uses CPU as a resource example. It should be understood that the demand estimation problem may apply to other resources, including but not limited to, disk, or like, etc.

The example formulation uses the following notations.

Machine set: $M=\{m_1, m_2, \ldots, m_{|M|}\}$, where $m_k$ denotes the k-th machine. The notations below are defined for each machine $m \in M$.

Atomic services on machine m: $A=\{a_0, a_1, a_2, \ldots, a_{|A|}\}$, where $a_i$ ($i \geq 1$) denotes the i-th atomic service class on machine m. $a_0$ abstractly represents all background jobs (i.e., those jobs not involved in providing services) running on machine m.

Composite services on machine m: $C=\{c_0, c_1, c_2, \ldots, c_{|C|}\}$, where $c_i$ ($i \geq 1$) denotes the i-th composite service class on machine m. $c_0$ represents background jobs at the composite service level, $c_0 = a_0$.

Service composition matrix on machine m: $P=[P(i,j)]$, $0 \leq i \leq |C|$, $0 \leq j \leq |A|$, where $P(i,j)$, $i,j \geq 1$, denotes the number of times that atomic service $a_j$ is invoked by composite service $c_i$ when processing one request. Note that $P(0,0)=1$ and $P(i,i)=0$, $i \neq 0$.

Atomic-service CPU demand vector on machine m: $N_A = [n_A(i)]$, $0 \leq i \leq |A|$, where $n_A(i)$, $i \geq 1$, denotes the CPU cycles needed to process one request of atomic service $a_i$, and $n_A(0)$ denotes the CPU cycles needed per second to process background jobs.

Composite-service CPU demand vector on machine m: $N_C = [n_C(i)]$, $0 \leq i \leq |C|$, where $n_C(i)$, $i \geq 1$, denotes the CPU cycles needed to process one request of composite service $c_i$, and $n_C(0)$ denotes the CPU cycles needed per second to process background jobs. The composition constraint states that the CPU demand of a composite service must be equal to the sum of the CPU demand of its constituent atomic services, i.e., $$N_C = PN_A. \qquad (1)$$

Time window for collecting measurement data: $W=\{w_1, w_2, \ldots, w_{|W|}\}$. The time is divided into windows of equal length (e.g., 5 minutes), where $w_i$ denotes the i-th measurement window. Monitoring data are collected and reported once every time window.

Throughput matrix for composite services on machine m: $T_C = [t_C(i,j)]$, $1 \leq i \leq |W|$, $0 \leq j \leq |C|$, where $t_C(i,j)$ denotes the throughput (i.e., processed requests per second) of composite service $c_j$ during measurement window $w_i$. For background jobs $c_0$, $t_C(i,0)=1, 1 \leq i \leq |W|$.

Throughput matrix for atomic services on machine m: $T_A = [t_A(i,j)]$, $1 \leq i \leq |W|$, $0 \leq j \leq |A|$, where $t_A(i,j)$ denotes the throughput of atomic service $a_j$ during measurement window $w_i$. For background jobs $a_0$, $t_C(i,0)=1, 1 \leq i \leq |W|$. The relationship between $T_A$ and $T_C$ is $$T_A = T_C P. \qquad (2)$$

CPU utilization of machine m: $U=[u(i)]$, $1 \leq i \leq |W|$, where $u(i)$ is the measured CPU utilization of machine m during measurement window $w_i \in W$. The machine utilization constraint states that the CPU utilization is the sum of the CPU demand of all composite services and background jobs, plus a measurement noise, i.e., $$U = T_C N_C + \epsilon. \qquad (3)$$

where $\epsilon$ is a ($|W| \times 1$) vector of noises. Combining equations (1) and (2), we have $$U = T_A N_A + \epsilon. \qquad (4)$$

The CPU demand estimation problem may be solved with or without leveraging the service composition relationship. The following presents the problem formulation that does utilize this relationship.

Inputs:

A set of atomic services A

A set of composite services C

Service composition matrix P

Throughput matrix of composite services $T_C$

CPU utilization vector U.

Objective:

Estimate CPU demand $\hat{N}_C$ of composite services, while minimizing the sum of squares of errors, i.e., minimize $E_C' E_C$ where $E_C = U - T_C \hat{N}_C$. The definition of the error vector E is described below.

Subject to: Composition Constraint of Equation 1 above. Solution to this problem is described below.

The above set of inputs and objective subject to constraints illustrated CPU demand estimation with service composition relationship.

The CPU demand estimation problem that does not utilize the service composition relationship can be formulated as follows.

Inputs:

A set of atomic services A

Throughput matrix of atomic services $T_A$

CPU utilization vector U.

Objective:

Estimate CPU demand $\hat{N}_A$ of atomic services, while minimizing the sum of squares of errors, i.e., minimize $E_A' E_A$ where $E_A = U - T_A \hat{N}_A$. The definition of the error vector $E_A$ is described below.

Solution: The solution directly follows from the least squares problem:

$$\hat{N}_A = (T_A' T_A)^{-1} T_A' U.$$

The above set of inputs and objective illustrated CPU demand estimation without service composition relationship.

By utilizing the service composition relationship, one can identify atomic services whose throughputs are linearly proportional to each other due to composition relationship. (e.g., in credit-card-payment composite service, the two constituent lower level atomic-services, charge-credit-card and email notification have the same throughputs), and consequently use linear algebra to eliminate the collinear problem introduced by composition relationships. Furthermore, the method can reduce the number of unknown variables in the linear regression problem. This reduction leads to less measurement data required for solving the estimation problem. In a dynamic SOA environment, this further translates into faster response to changing workloads and more accurate estimation.

The effect of leveraging the service composition relationship is demonstrated with the simple example, where the atomic services A, composite services C, and composition matrix P are as follows:

$$A = \begin{bmatrix} a_0 \\ a_1 \\ a_2 \\ a_3 \end{bmatrix}; C = \begin{bmatrix} c_0 \\ c_1 \end{bmatrix}; P = \begin{bmatrix} 1000 \\ 0111 \end{bmatrix}. \tag{5}$$

The measurement windows are $W=\{w_1, w_2, w_3, w_4\}$. The throughput matrix $T_C$, $T_A$, and CPU utilization vector U are, $$T_C = \begin{bmatrix} 11 \\ 14 \\ 12 \\ 13 \end{bmatrix}; T_A = \begin{bmatrix} 1111 \\ 1444 \\ 1222 \\ 1333 \end{bmatrix}; U = \begin{bmatrix} 1 \\ 4 \\ 2 \\ 3 \end{bmatrix}. \tag{6}$$

In this example, the CPU demand of atomic services $a_1$, $a_2$, $a_3$ cannot be uniquely determined, because their throughputs are always proportional to each other, as indicated in the composition matrix P. When the three atomic services' throughputs are always equal to each other, there is no unique solution to decompose the aggregated resource utilization to each individual one (one solution could be that only $a_1$ utilizes resource, the other solution could be that only $a_2$ utilizes resource). Without knowing the composition relationship, and assuming the throughput of atomic services is independent of each other, the number of unknown variables is 4. Therefore, the minimum number of measurement windows needed is 4. Moreover, it may require data collected in much more than 4 measurement windows to reliably infer the existence and cause of collinearity.

By contrast, by analyzing the composition matrix P, it can be identified that atomic service $a_0$, $a_1$, $a_2$ are collinear and must be components of composite service $c_1$. This allows for merging of $a_0$, $a_1$, $a_2$ into a single variable that is related to $c_1$, and reduce the number of unknown variables from 4 to 2, i.e., a 50% reduction. This reduction not only shortens measurement time, but also makes the system more responsive to changing workloads and gives more accurate estimation in a dynamic SOA environment. Note that the mean CPU demand of a service may change over time and is hardly a constant in practice. For example, database lookup may take longer and longer as more data are inserted into the database. Moreover, many deployed real systems use measurement window size somewhere between 5 to 15 minutes, in order to collect reliable measurement data and to reduce measurement overhead. For these systems with a long delay, algorithms that can make quicker decisions have a fundamental advantage in terms of dynamic resource provisioning.

An algorithm that leverages service composition relationship to solve the CPU demand estimation problem is described below. In one embodiment, we first use matrix rank reduction to reduce the number of unknown variables, and then solve it using linear regression.

To simplify the problem, we compute the rank and the basis of the row vectors of the service composition matrix P using Gaussian elimination. Let B denote the matrix that formed by a set of basis row vectors of P. From the definition of basis, there exists a matrix Z such that $$P=ZB; \text{Rank}(P)=\text{Row}(B), \tag{7}$$

where Row(B) is the number of rows in B.

Recall that the goal is to solve the multivariate linear regression problem in equation (3) (repeated below), $$U=T_C N_C + \epsilon.$$

Combining equations (1) and (7), we have, $$U = T_C P N_A + \epsilon = (T_C Z)(B N_A) + \epsilon.$$

Let $T=T_C Z$ and $N=B N_A$. A simplified version of the original problem is $$U = TN + \epsilon, \tag{8}$$

where the number of unknown variables Row(N) is equal to Rank(P). Linear algebra tells us that Rank(P) is the minimum number of independent row or column vectors of the composition matrix P, and Rank(P)≤Row(P), Rank(P)≤Col(P). Here Col(P) is the number of columns of P, and is equal to the number of unknown variables of the problem, which does not utilize composition relationship.

Because Rank(P)≤Col(P), the following theorem states that leveraging composition relationship help eliminate the collinearity which is introduced by composition relationship by merging the dependent unknown variables, and reduce the number of unknown variables from Col(P) to Rank(P).

Theorem 1: The simplified version (i.e., equation (8)) of the problem, which leverages composition relationship has unknown variables fewer than or equal to those of the problem, which does not leverage composition relationship.

We now solve the simplified problem in equation (8)) using linear regression. Least-square estimation is a widely used method for solving linear regression problems. Assuming that explanatory variables T are measured with negligible error, it estimates N by finding $\hat{N}$ that minimizes the sum of squares of errors, $$\text{minimize } \epsilon'_S \epsilon_S, \tag{9}$$

where $$\epsilon_S = U - T\hat{N}. \tag{10}$$

It is known that the least-square estimate $\hat{N}$ is given by, $$\hat{N} = (T'T)^{-1} T'U. \tag{11}$$

Assuming that the random errors $\epsilon_i$ are unbiased ($E(\epsilon_i)=0$)), uncorrelated ($\text{var}(\epsilon_i, \epsilon_j)=0$), and homoscedastic ($\text{cov}(\epsilon_i, \epsilon_j)=0$), the least-square estimate $\hat{N}$ is proven to be the best linear unbiased estimate of N. The mean and variance of $\hat{N}$ is given by, $$E(\hat{N}) = N \tag{12}$$

$$\text{var}(\hat{N}) = \sigma^2 (T'T)^{-1}. \tag{13}$$

An unbiased estimate of $\sigma^2$ is given by $$\sigma^2 = \frac{(U - T\hat{N})'(Y - T\hat{N})}{|W| - \text{Rank}(T)}. \tag{14}$$

Assuming the unknown variables are independent of one another, the number of samples used in linear regression must be equal to or greater than the number of unknown variables. From the above-described Theorem 1, we know that leveraging composition relationship helps reduce the number of unknown variables (and hence minimal samples) from Col(P) to Rank(P).

Once we solve the simplified problem in equation (8) and obtain $\hat{N}$, we can map the solution back to the original problem. Combining equations (1) and (7), $\hat{N}_C$ (an estimation of $N_C$) is, $$\hat{N}_C = Z\hat{N}. \tag{15}$$

Assuming that unknown parameters in N are independent, we have, $$E(\hat{N}_C) = ZE(\hat{N}) \quad (16)$$

$$\text{var}(\hat{N}_C) = Z\text{var}(\hat{N}). \quad (17)$$

One unknown variable may represent the resource demand of one atomic service. Combining multiple collinear atomic services into a single one and estimating the resource consumption of the combined one reduce the number of unknown variables.

Figure 4:
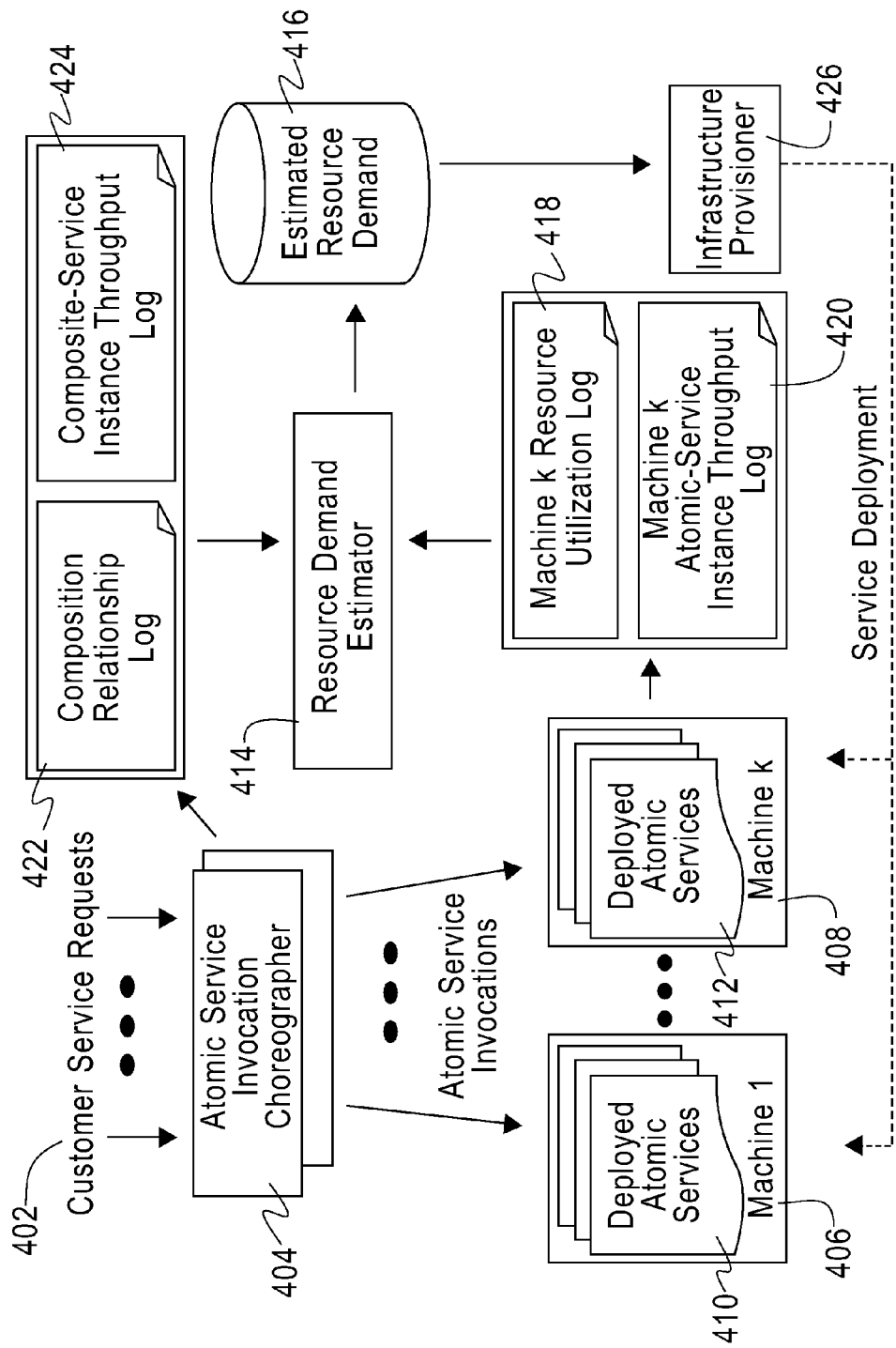
FIG. 4 is an architectural diagram illustrating service oriented architecture in which the resource demand estimation method of the present disclosure in one embodiment may be implemented and utilized.

FIG. 4 is an architectural diagram illustrating service oriented architecture (SOA), in which the resource demand estimation method of the present disclosure in one embodiment may be implemented and utilized. When a customer request (e.g., order processing) 402 arrives, the atomic service invocation choreographer 404, generates a composite service instance according to a composite service template and then executes it on machines 406, 408 by invoking the underlying atomic services (e.g., credit card authorization and warehouse catalog searching) 410, 412. A composite service template specifies the composition rules that connect the atomic services into a complete end-to-end service, using composition operators such as sequential, parallel, and branch.

The composition rules (or composition relationships) specify how atomic services are invoked. This information can be gathered without depending on the customer requests arriving. The method of the present disclosure in one embodiment can infer composition rules from invocation log 216 (an optional input). The method may also take other (mandatory) inputs, i.e., the resource utilization log and the request arrival log, both of which can only be collected with the customer requests arriving. The method of the present disclosure runs offline in one embodiment after those logs are collected. Using the log inputs and optionally, the composition relationship, the method of the present disclosure in one embodiment eliminates the collinear problem introduced by composition relationship, and improve the quality of estimation results.

A resource demand estimator 414 computes estimated resource demand 416, using input data such as resource utilization log 418, instance throughput log 420, composition relationship log 422, composite-service instance throughput log 424, which may be then used by infrastructure provisioner 426 to make capacity planning and resource provisioning decisions. The resource demand estimator 424 may use the above-described regression method for generating the estimated resource demand 416.

Figure 5:
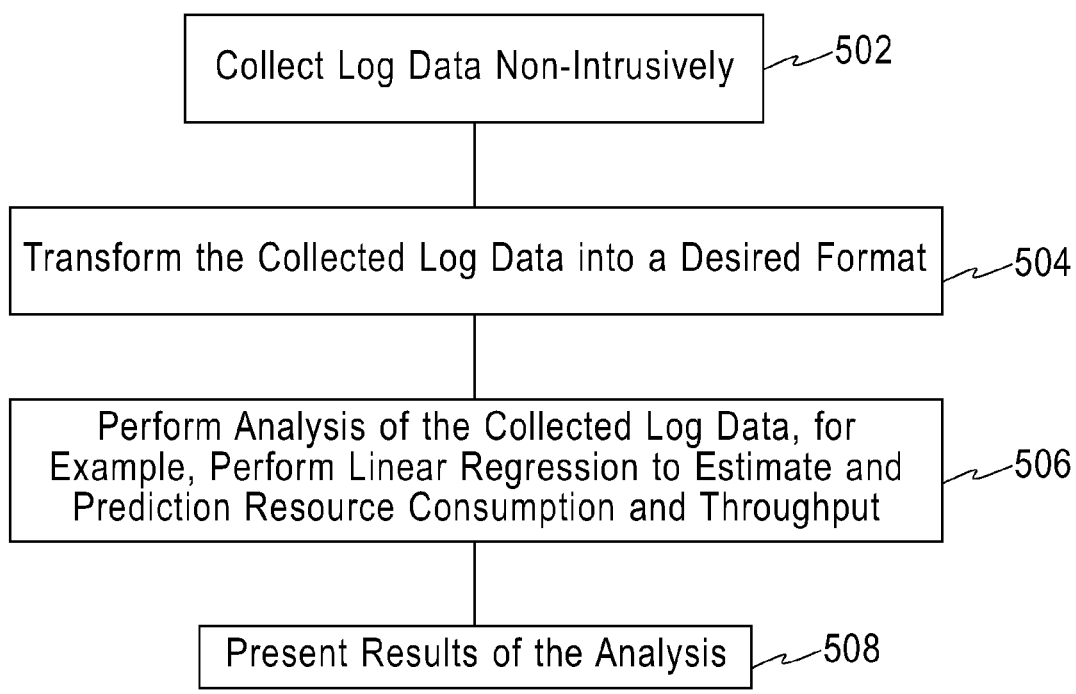
FIG. 5 is a flow diagram illustrating the method of the present disclosure in one embodiment.

FIG. 5 is a flow diagram illustrating the method of the present disclosure in one embodiment. At step 502, data is collected non-intrusively from a production system whose health is being checked. For instance, normal log data that the production system is collecting or processing in its usual course of running the system or that is typically available, can be received from the system, for example, either automatically or from the system administrator. The log data may be transferred directly from the system or via a storage devices or computer medium such as disks, tapes, etc. At step 504, data transformer processes the log data and normalizes the data into a format that can be handled by an analyzer. For instance, the log data may be typed into different categories. The log data may also be formatted into a generic format or common format. The log data includes at least the information about the transactions that occurred in the production system and resource utilization of that production system. At step 506, analysis is performed on the data. For example, data regression analysis is used to estimate resources consumed by each of the transactions and throughput of each of said transactions. Further, predictions for future resource consumption and throughput may be estimated using the regression analysis. The regression analysis may be also performed using composite relationships among one or more transactions, for instance, to reduce the number unknown variables in the regression analysis. At step 508, the results of the analysis may be presented using various visualization techniques such as graphs, charts, tables, etc., for example, via a user interface. The user interface may be Web-based.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. Tie hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for checking health of information technology infrastructure based on log data, comprising:

collecting log data non-intrusively from a production system, said log data at least associated with transactions occurring in the production system and resource utilization of the production system;

normalizing said log data into a plurality of log data types;

performing data regression analysis using said plurality of log data types to estimate resources consumed by each of said transactions and throughput of each of said transactions, the data regression analysis including solving a least square problem of linear regression between the observed request throughput and resource utilization level;

using a queuing model based on the estimated resources consumed and the estimated throughput to predict performance of the information technology infrastructure under a plurality of workloads; and identifying one or more potential performance issues and recommending solutions.

2. The method of claim 1, wherein said step of normalizing includes transforming product-specific log data into generic data format.

3. The method of claim 1, wherein said production system includes a server.

4. The method of claim 1, wherein said production system includes a cluster of servers further comprising at least a load balancer and a plurality of servers.

5. The method of claim 1, wherein said step of performing data regression analysis includes performing partial diagnosis using available log data types.

6. The method of claim 5, wherein said step of performing data regression analysis further includes continuing said partial diagnosis as more log data types become available.

7. The method of claim 1, wherein said step of performing data regression analysis includes predicting future resource consumption in said production system.

8. The method of claim 1, further including presenting one or more results of said performing data regression analysis step via a user interface.

9. The method of claim 1, wherein said step of performing data regression analysis further includes reducing number of unknown variables in the data regression analysis and eliminating collinearity between atomic transactions introduced by composition relationships based on linear dependency between a set of composite transactions and a set of low-level atomic transactions.

10. The method of claim 1, wherein using the queuing model includes predicting average transaction response times $E(r_i)$ and average transaction waiting times ($E(r_i)-E(s_i)$) for machine utilization $\rho$, by using $$\rho = \sum_j \lambda_j E(s_j),$$

where $s_i$ represent the service time for transaction type i, and $\lambda_i$ represent transaction arrival rate, and estimating as $E(r_i)=E(s_i)/(1-\rho)$ for a machine that utilizes round-robin scheduling policy, and estimating as $$E(r_i) = \frac{\sum_j \lambda_j [E(s_j)^2]}{1 - \sum_j \lambda_j E(s_j)} + E(s_i),$$

for a machine that utilizes first-come-first-serve scheduling policy, where $E(r_i)$ represents average response time of type i transactions.

11. A system for checking health of information technology infrastructure based on log data, comprising:

a processor;

a computer-implemented analyzer module operable to use log data collected non-intrusively from a production system, said log data at least associated with transactions occurring in the production system and resource utilization of the production system; and a computer-implemented data transformer module operable to normalize said log data into a plurality of log data types, said analyzer module further operable to perform data regression analysis using said plurality of log data types to estimate resources consumed by each of said transactions and throughput of each of said transactions.

12. The system of claim 11, further including:

a storage device for storing said normalized log data and results of said analysis.

13. The system of claim 11, further including:

a user interface module operable to receive user inputs and present results of said analysis.

14. The system of claim 11, wherein said analyzer module and data transformer module are implemented as a virtual machine running on a native machine.

15. The system of claim 14, further including a shared storage storing said normalized log data and results of said analysis, wherein the virtual machine and the native machine share the shared storage.

16. The system of claim 11, further including:

a Web interface module operable to receive user inputs and present results of said analysis.

17. The system of claim 11, wherein said production system includes a cluster of servers and a load balancer.

18. The system of claim 11, wherein said production system includes a server.

19. The system of claim 11, wherein said analyzer module further reduces number of unknown variables in the regression analysis and eliminates collinearity between atomic transactions introduced by composition relationships based on linear dependency between a set of composite transactions and a set of low-level atomic transactions.

20. A program storage device readable by a machine, tangibly embodying a program of instructions executable by the machine to perform a method of checking health of information technology infrastructure based on log data, comprising:

collecting log data non-intrusively from a production system, said log data at least associated with transactions occurring in the production system and resource utilization of the production system;

normalizing said log data into a plurality of log data types; and performing data regression analysis using said plurality of log data types to estimate resources consumed by each of said transactions and throughput of each of said transactions.

* * * * *